(12) United States Patent
Stokes

(10) Patent No.: US 6,769,658 B2
(45) Date of Patent: Aug. 3, 2004

(54) REMOTE CONTROL HOLDER DEVICE

(75) Inventor: James R. Stokes, 7430 Centerwood Ave., Springhill, FL (US) 34606

(73) Assignee: James R. Stokes, Spring Hill, FL (US)

( * ) Notice: Subject to any disclaimer, the term of this patent is extended or adjusted under 35 U.S.C. 154(b) by 0 days.

(21) Appl. No.: 10/325,207

(22) Filed: Dec. 19, 2002

(65) Prior Publication Data

US 2004/0118988 A1 Jun. 24, 2004

(51) Int. Cl.[7] .................................................. A47F 5/00
(52) U.S. Cl. .................................................. 248/309.1
(58) Field of Search ........................... 248/346.03, 310, 248/309.1, 311.2

(56) References Cited

U.S. PATENT DOCUMENTS

| 4,494,755 | A | * | 1/1985 | Caillouet, Jr. ................ 463/47 |
| 4,815,683 | A | * | 3/1989 | Ferrante .................. 248/205.2 |
| 4,848,609 | A | * | 7/1989 | Meghnot .................... 211/26.1 |
| 4,923,427 | A | * | 5/1990 | Roland ........................ 446/153 |
| 5,033,709 | A | * | 7/1991 | Yuen ........................... 248/313 |
| 5,152,705 | A | * | 10/1992 | Rock ............................ 441/74 |
| 5,305,980 | A | * | 4/1994 | Le Blanc ................. 248/309.1 |
| 5,947,788 | A | * | 9/1999 | Derrah ....................... 446/154 |
| 6,062,518 | A | * | 5/2000 | Etue ....................... 248/231.21 |
| 6,095,470 | A | * | 8/2000 | Kalis ....................... 248/309.1 |
| 6,135,408 | A | * | 10/2000 | Richter .................... 248/309.4 |
| 6,183,333 | B1 | * | 2/2001 | Hall ........................... 446/154 |
| 6,227,505 | B1 | * | 5/2001 | Van Order et al. ..... 248/222.13 |
| 6,253,982 | B1 | * | 7/2001 | Gerardi ....................... 224/544 |
| 6,554,239 | B2 | * | 4/2003 | Stilley et al. ............ 248/309.1 |
| 2003/0025057 | A1 | * | 2/2003 | Furukawa ................ 248/309.1 |

* cited by examiner

Primary Examiner—Leslie A. Braun
Assistant Examiner—A. Joseph Wujciak

(57) ABSTRACT

A remote control holder system that includes an ornamental remote control cover that is detachably connectable to a corresponding base. The remote control cover resembles a surfboard and the base resembles a breaking wave so as to visually convey the practice of channel surfing.

1 Claim, 1 Drawing Sheet

REMOTE CONTROL HOLDER DEVICE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a remote control holder, and more particularly, to a remote control holding device that simulates a wave and provides a novelty device.

2. Description of Related Art

Conversation pieces are convenient ice-breakers that allow individuals to express themselves. In addition, unusual items that fit a person's personality are often sought as gift items. However, no known such items are known with respect to remote controls. Sparky It would be desirable, therefore, to have a remote control holder system including an ornamental remote control cover that was detachably connectable to a base. As flipping through channels to determine what is playing is called channel surfing, it would be desirable to have the ornamental remote control cover resemble a surfboard and the base resemble a breaking wave. If a device existed that had these characteristics, it would be well received. The instant invention addresses this unfulfilled need in the prior art by providing a remote control holder that resembles a surfboard and wave to play off the theme of channel surfing.

BRIEF SUMMARY OF THE INVENTION

In light of the foregoing, it is an object of the present invention to provide a functional and ornamental remote control holder.

It is another object of the instant invention to provide a remote control holder that secures a standard remote control.

It is a further object of the instant invention to provide a remote control holder that does not interfere with the transmission of signals.

It is an additional object of the instant invention to provide a remote control holding device that conveys a message correlating channel surfing with conventional surfing.

It is also an object of the instant invention to provide a remote control holding device having a remote control cover that releasably mounts to a base.

It is yet another object of the instant invention to provide a remote control holding device having a remote control cover that resembles a surfboard and a base that resembles a breaking wave.

In light of these and other objects, the instant invention comprises a remote control holding device that includes a remote control holder having an ornamental remote control cover that is detachably removable from a corresponding base. The remote control cover preferably has the general shape and appearance of a surfboard and attaches to the base, which resembles a breaking wave at the upper portion of the base. The cover includes a signal transmission opening that allows the signal to transmit to the receiver of the unit being controlled. The remote control preferably snap fits into a compartment or holding cavity defined by the control cover such that the operative buttons of the remote control are accessible and so the remote faces the front of the cover with the transmitter in alignment with the signal transmission opening. The cover snaps onto the base. The cover preferably has prongs that releasably snap into clips found on the base. The sides of the base provide an area for placing artwork, such as logos, advertising or other indicia.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

Figure 1:
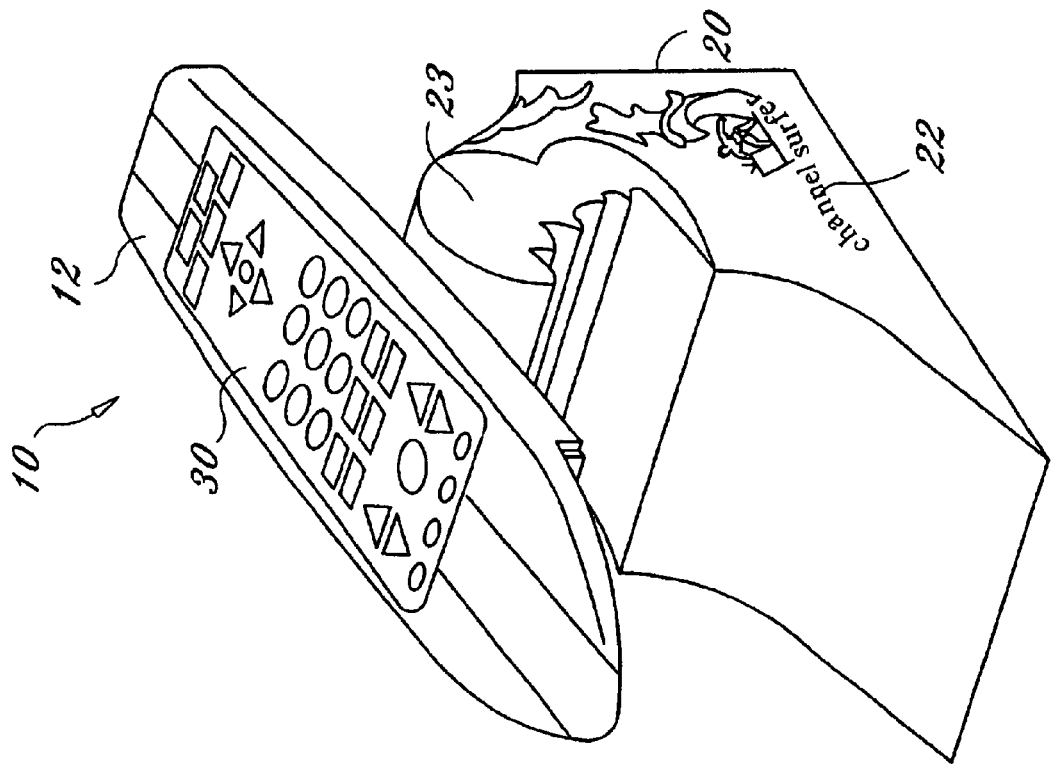
FIG. 1 is an exploded perspective view of an exemplary embodiment of the remote control holding device of the present invention.
Figure 2:
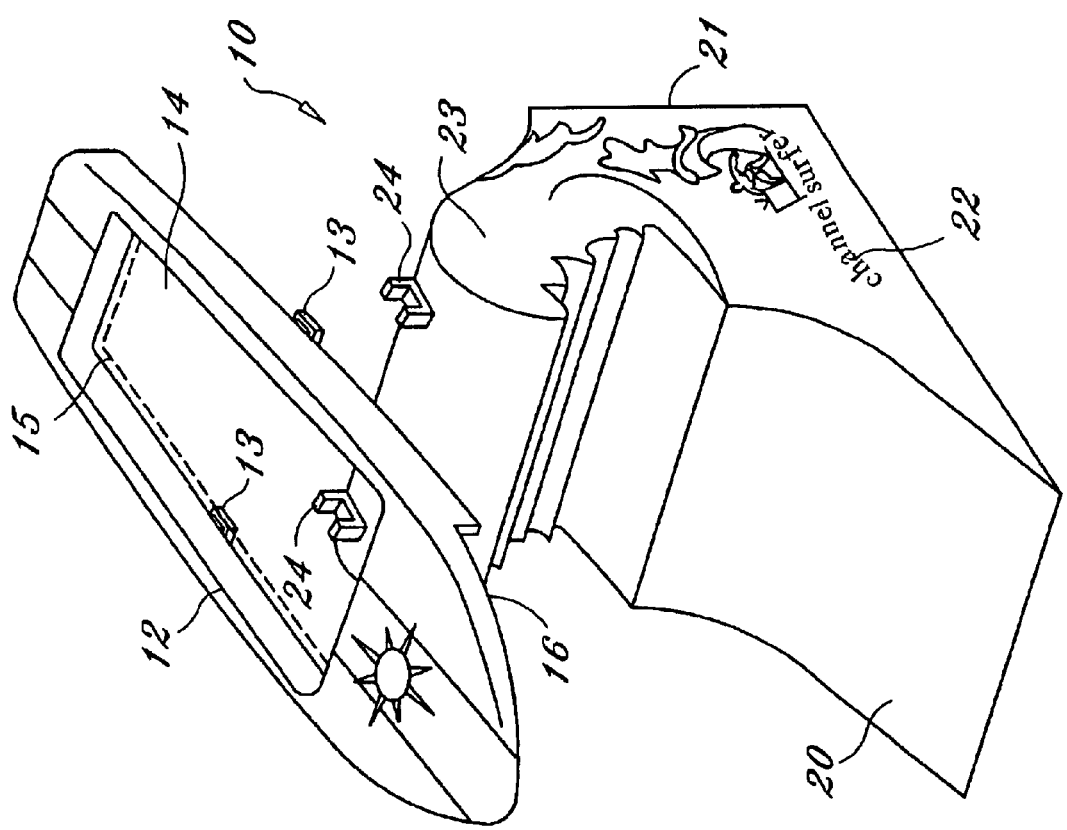
FIG. 2 is a perspective view of the remote control holding device of FIG. 1 with a representative remote control installed therein.

With reference to the drawings, FIGS. 1 and 2 depict the preferred embodiment of the instant invention which is generally referenced as a remote control holder and, or by numeric character 10. FIGS. 1 and 2 show various aspects of an exemplary embodiment of the remote control holding device 10 of the present invention. With reference to FIGS. 1 and 2, the present invention relates to remote control holder 10 and more particularly to a remote control holding device 10 comprising an ornamental and functional remote control cover 12 and base 20 wherein the cover 12 releasably mounts to the base 20. The remote control cover 12 comprises a frame 12, remote control holding cavity 14, signal transmission notch 16 defined by the bow and prongs 13 depending downward from the cover 12. The remote control cover 12 has the ornamental and general shape and appearance of a surfboard and releasably attaches to the base 20. The remote control holding cavity 14 receives and secures the remote control 30 and may have a bottom end that is open with at least one edge or closed. The remote control cover 12 defines a notch 16 at the front end to provide clearance for the transmitted infrared beam or signal. The front of the cavity 14 preferably has an aperture or elongated slot that facilitates transmission of signals from the remote control 30. The remote control 30 fits inside or snaps into the holding cavity 14 of the cover 12, preferably with a releasable snap fit. When the remote control 30 is properly installed, the operative buttons are accessible and the transmitting end of the remote control 30 faces in the same direction as notch 16.

The base 20 comprises a main body having sidewalls 21, select indicia 22 and prong receptacles 24. The main body of the base 20 comprises the shape of a breaking wave 23 at the upper portion of the base 20. The sidewalls 21 define an area for placing indicia 22, such as logos, advertising and other indicia. The base 20 has at least one clip 24 for interlocking with the prongs 13 on the cover 12.

The remote control cover 12 detachably mounts to the base 20. The cover 12 has at least one prong, and preferably two, that depends from the cover 12, as shown in FIG. 1. The base 20 has at least one clip 24 and preferably two clips 24 mounted to or formed integrally with the upper portion 23 of the base 20. The prong(s) 13 snaps into the clip(s) 24, which has two biasing arms with a shape and dimensions that facilitate interlocking engagement between the prong 13 and clip 24. In an alternative embodiment, the prongs 13 may project from the base 20 and the clips 24 may depend from the cover 12.

The remote control cover 12 has the general shape and appearance of a surfboard and defines a holding cavity 14 that receives and secures a remote control 30. The cavity 14 may have a floor or at least one ledge 15 for supporting the remote control 12 and, or may include snaps for engaging and securing the remote control 30. Once installed in the cavity 14, the operative buttons of the remote control 30 are accessible through the open top end and the transmitting end of remote control 30 aligns with the notch 16.

The base 12 has an upper end 23 that has the shape of a breaking wave. The sides 21 define an area for placing artwork, such as logos, advertising or other indicia 22. The cover 12 and base 20 are preferably manufactured from a plastic or rubber based material.

It can be seen from the preceding description that a remote control holding device 10 has been provided. The remote control holding device 10 allows a remote control 30 to be used as is customary and provides a convenient, decorative mounting structure for holding the remote control.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A remote control holding device for holding a remote control, said device comprising: a cover having a cavity adapted for receiving and holding the remote control, a base adapted for supporting said cover, said base includes at least one upwardly extending U-shaped clip; and said cover comprising at least one downwardly extending prong that is releasably snapped into said at least one clip on said base, whereby said cover is detachably connectable to said base, said cover having a predetermined shaped adapted to substantially resemble a surfboard, and said cover having a notch defined at a front end of said cover, said notch adapted to provide clearance for passing a transmitted signal from a remote control, and said base having a predetermined shape adapted to substantially resemble a breaking wave.

* * * * *